United States Patent
Ma et al.

(10) Patent No.: US 11,841,716 B2
(45) Date of Patent: Dec. 12, 2023

(54) LOAD-SENSING MULTI-WAY VALVE WORK SECTION

(71) Applicant: Danfoss Power Solutions (Zhejiang) Co. Ltd., Zhejiang (CN)

(72) Inventors: Zhongxiao Ma, Haiyan (CN); Likui Zhai, Haiyan (CN); Shenzhi He, Haiyan (CN)

(73) Assignee: Danfoss Power Solutions (Zhejiang) Co. Ltd., Zhejiang (CN)

( * ) Notice: Subject to any disclaimer, the term of this patent is extended or adjusted under 35 U.S.C. 154(b) by 0 days.

(21) Appl. No.: 17/559,193

(22) Filed: Dec. 22, 2021

(65) Prior Publication Data

US 2022/0206517 A1 Jun. 30, 2022

(30) Foreign Application Priority Data

Dec. 28, 2020 (CN) .......................... 202011586255.2
Dec. 28, 2020 (CN) .......................... 202023224845.9

(51) Int. Cl.
*G05D 16/10* (2006.01)
*G05D 16/04* (2006.01)

(52) U.S. Cl.
CPC ....... *G05D 16/101* (2019.01); *G05D 16/0404* (2019.01)

(58) Field of Classification Search
CPC ........ Y10T 137/87185; F15B 13/0417; G05D 16/0404; G05D 16/101; F16K 11/07
See application file for complete search history.

(56) References Cited

U.S. PATENT DOCUMENTS 3,602,104 A 8/1971 Stremple
4,890,647 A 1/1990 Pfuhl et al.
(Continued)

FOREIGN PATENT DOCUMENTS

CN 105840571 B 11/2017
DE 102015215267 A1 2/2016
(Continued)

OTHER PUBLICATIONS

Machine Translation of JPS60196408A retrieved from espacenet.com on Dec. 23, 2022 (Year: 2022).*
(Continued)

*Primary Examiner* — Jessica Cahill
(74) *Attorney, Agent, or Firm* — McCormick, Paulding & Huber PLLC

(57) ABSTRACT

Disclosed is a load-sensing multi-way valve work section comprising a valve body, which comprises a compensation valve and a reversing valve both formed therein, wherein the compensation valve is provided with a compensation valve bore formed in the valve body and a compensation valve spool accommodated in the compensation valve bore, with a compensation valve oil inlet chamber, a compensation valve oil outlet chamber, a spring-side control chamber and a springless-side control chamber all being formed inside the compensation valve bore; wherein the reversing valve is provided with a reversing valve bore formed in the valve body and a reversing valve spool accommodated in the reversing valve bore, the reversing valve spool being configured to control communications among a main oil inlet chamber, a first working oil chamber, a second working oil chamber, a first oil return chamber, a second oil return chamber, a first load-sensing feedback pressure sensing opening and a second load-sensing feedback pressure sensing opening formed in the reversing valve bore, the com-
(Continued)

pensation valve oil outlet chamber being communicated to the main oil inlet chamber; and wherein the load-sensing multi-way valve work section also defines a feedback passage formed within the valve body, the feedback passage being configured to communicate one of the first and second load-sensing feedback pressure sensing openings with the spring-side control chamber depending on a position of the reversing valve spool in the reversing valve bore.

20 Claims, 10 Drawing Sheets

(56) References Cited

U.S. PATENT DOCUMENTS

| | | | | |
|---|---|---|---|---|
| 5,921,279 | A * | 7/1999 | Barber | F15B 13/0402 91/464 |
| 6,098,403 | A * | 8/2000 | Wilke | F15B 13/0417 137/625.68 |
| 6,135,149 | A * | 10/2000 | Nozawa | F15B 13/0417 137/596.13 |
| 7,870,729 | B2 * | 1/2011 | Kauss | F15B 11/165 91/516 |
| 8,356,545 | B2 | 1/2013 | Stellwagen | |
| 9,328,844 | B2 | 5/2016 | Pingani et al. | |
| 2013/0153043 | A1 * | 6/2013 | Payne | F15B 13/0417 60/459 |

FOREIGN PATENT DOCUMENTS

| | | |
|---|---|---|
| EP | 1170510 A2 | 1/2002 |
| EP | 1635072 A1 | 3/2006 |
| EP | 2157320 A1 | 2/2010 |
| EP | 3018364 A | 5/2016 |
| EP | 3093505 A1 | 11/2016 |
| EP | 3135924 A1 | 3/2017 |
| JP | 60196408 A | 10/1985 |

OTHER PUBLICATIONS

European Search Report for Patent Application No. 21 21 3299 dated Apr. 27, 2022.

* cited by examiner

LOAD-SENSING MULTI-WAY VALVE WORK SECTION

CROSS-REFERENCE TO RELATED INVENTION

The present disclosure claims the benefit of Chinese Patent Application Invention No. 202011586255.2 and 202023224845.9 both filed on Dec. 28, 2020 in the China National Intellectual Property Administration, the whole disclosure of each is incorporated herein by reference.

BACKGROUND OF THE DISCLOSURE

Field of the Disclosure

The present application relates to a multi-way valve work section, in particular to a load-sensing multi-way valve work section usable in a hydraulic system.

Description of the Related Art

In the prior art, it is required that operation of mobile machinery including engineering vehicles can be completed by a compound movement performed by a plurality of hydraulic actuating mechanisms to perform compound movements together. Therefore, a plurality of hydraulic reversing valves are required to control respective movement speeds and movement directions of the plurality of actuating mechanisms respectively. A multi-way valve is a combination of the reversing valves that is able to control the plurality of the hydraulic actuating mechanisms. The multi-way valve is a multifunction integrated valve which is constructed based on two or more reversing valves and having reversing valve(s), one-way valve(s), safety valve(s)/relief valve(s), and shuttle valves and the like integrated therein. The load-sensing multi-way valve is a common multi-way valve, which is provided with a compensation valve, so that when various actuating mechanisms are working, a working flow is only related to opening level of a valve spool and has nothing to do with a load pressure. Like other multi-way valves, load-sensing multi-way valves generally comprise an input section, an end section and work section(s) between the input and end sections.

However, existing load-sensing multi-way valve work section adopts a relatively complicated structural design in order to realize desired function(s), resulting in a relatively large volume of the load-sensing multi-way valve work section and a relatively high manufacturing cost thereof.

In this application, it is proposed a new type of load-sensing multi-way valve work section with a simplified structural design, which may reduce the volume of the load-sensing multi-way valve work section while improving a working performance and reducing the manufacturing cost thereof. In addition, the work section of the present application may not only increase a power density of a valve group, but also meet requirements of an application of a proportional valve group in a relatively narrow and small space.

SUMMARY OF THE DISCLOSURE

The present application provides a load-sensing multi-way valve work section comprising a valve body, which comprises a compensation valve and a reversing valve both formed therein, wherein the compensation valve is provided with a compensation valve bore formed in the valve body and a compensation valve spool accommodated in the compensation valve bore, with a compensation valve oil inlet chamber, a compensation valve oil outlet chamber, a spring-side control chamber and a springless-side control chamber all being formed inside the compensation valve bore; wherein the reversing valve is provided with a reversing valve bore formed in the valve body and a reversing valve spool accommodated in the reversing valve bore, the reversing valve spool being configured to control communications among a main oil inlet chamber, a first working oil chamber, a second working oil chamber, a first oil return chamber, a second oil return chamber, a first load-sensing feedback pressure sensing opening and a second load-sensing feedback pressure sensing opening formed in the reversing valve bore, the compensation valve oil outlet chamber being communicated to the main oil inlet chamber; and wherein the load-sensing multi-way valve work section also defines a feedback passage formed within the valve body, the feedback passage being configured to communicate one of the first and second load-sensing feedback pressure sensing openings with the spring-side control chamber depending on a position of the reversing valve spool in the reversing valve bore.

According to one aspect of the present application, wherein an oil inlet port, a first working oil port, a second working oil port, a first oil return port and a second oil return port are formed in the valve body and open to outside of the valve body, the oil inlet port is communicated with the compensation valve oil inlet chamber, the first working oil port is communicated with the first working oil chamber while the second working oil port is communicated with the second working oil chamber, respectively, and the first oil return port is communicated with the first oil return chamber while the second oil return port is communicated with the second oil return chamber, respectively.

According to one aspect of the present application, wherein the first oil return chamber, the first load-sensing feedback pressure sensing opening, the first working oil chamber, the main oil inlet chamber, the second working oil chamber, the second load-sensing feedback pressure sensing opening and the second oil return chamber are arranged in sequence axially in the reversing valve bore.

According to one aspect of the present application, in a condition that the reversing valve spool is located in a neutral position, neither the first working oil chamber nor the second working oil chamber is communicated to the main oil inlet chamber, the first load-sensing feedback pressure sensing opening is communicated with the first oil return chamber, and the second load-sensing feedback pressure sensing opening is communicated with the second oil return chamber; in a condition that the reversing valve is located in a first working position, the reversing valve spool moves towards a first side, the main oil inlet chamber is communicated with both the first working oil chamber and the first load-sensing feedback pressure sensing opening, the second working oil chamber and the second load-sensing feedback pressure sensing opening are both communicated with the second oil return chamber; and in a condition that the reversing valve is located in the second working position, the reversing valve spool moves towards a second side, the main oil inlet chamber is communicated with both the second working oil chamber and the second load-sensing feedback pressure sensing opening, the first working oil chamber and the first load-sensing feedback pressure sensing opening are both communicated with the first oil return chamber.

According to one aspect of the present application, the load-sensing multi-way valve work section further comprises a shuttle valve arranged in the feedback passage and configured to feed a larger one of a pressure from the first load-sensing feedback pressure sensing opening and a pressure from the second load-sensing feedback pressure sensing opening to the spring-side control chamber.

According to one aspect of the present application, wherein the feedback passage comprises a first feedback port communicating the first load-sensing feedback pressure sensing opening to the shuttle valve, a second feedback port communicating the second load-sensing feedback pressure sensing opening to the shuttle valve and a third feedback port communicating the shuttle valve to the spring-side control chamber, and wherein, a plane where both the compensation valve spool and the reversing valve spool are located is defined as a reference plane, and a plane where both the first feedback port and the second feedback port are located is perpendicular to the reference plane, and the third feedback port extends substantially parallel to the reference plane.

According to one aspect of the present application, wherein the shuttle valve comprises: a shuttle valve chamber formed in the valve body, the shuttle valve chamber being communicated to the first feedback port and extending along a direction in which the first feedback port extends; a sleeve fixedly arranged in the shuttle valve chamber, with an inner step being provided on a side of the sleeve facing towards the first feedback port, and a radial opening being arranged through a side wall of the sleeve to communicate with the second feedback port, wherein a third feedback port is communicated to the shuttle valve chamber between the first feedback port and the radial opening without being blocked by the sleeve; and a valve element located between the first feedback port and the inner step of the sleeve and configured to move under a larger pressure of the first feedback port and the second feedback port, so as to block one of the first feedback port and the inner step at a time, such that the second feedback port is communicated with the third feedback port in case that the first feedback port is blocked or the first feedback port is communicated with the third feedback port in case that the inner step is blocked.

According to one aspect of the present application, wherein a first annular pressure sensing groove communicating with the first load-sensing feedback pressure sensing opening and a second annular pressure sensing groove communicating with the second load-sensing feedback pressure sensing opening are both provided in the reversing valve bore.

According to one aspect of the present application, wherein in a condition that the reversing valve spool is located in a neutral position, the first load-sensing feedback pressure sensing opening is communicated with the first oil return chamber through the first annular pressure sensing groove and a first throttle groove which is formed on the reversing valve spool, and the second load-sensing feedback pressure sensing opening is communicated with the second oil return chamber through the second annular pressure sensing groove and a second throttle groove which is formed on the reversing valve spool.

According to one aspect of the present application, wherein a first balance groove is provided at a location locally in an inner wall of the reversing valve bore adjacent to the first annular pressure sensing groove, with a sum of respective axial dimensions of the first annular pressure sensing groove and the first balance groove being larger than an axial dimension of the first load-sensing feedback pressure sensing opening; and wherein a second balance groove is provided at a location, radially opposite to and symmetric with the first balance groove, in the inner wall of the reversing valve bore.

According to one aspect of the present application, wherein as seen in an axial direction of the reversing valve spool, the first balance groove and the second balance groove are both provided in the form of crescent shape, with respective depths of the first balance groove and the second balance groove being smaller than that of the first annular pressure sensing groove.

According to one aspect of the present application, wherein a third balance groove is provided at a location locally in an inner wall of the reversing valve bore adjacent to the second annular pressure sensing groove, with a sum of respective axial dimensions of the second annular pressure sensing groove and the third balance groove being larger than an axial dimension of the second load-sensing feedback pressure sensing opening; and wherein a fourth balance groove is provided at a location, radially opposite to and symmetric with the third balance groove, in the inner wall of the reversing valve bore.

According to one aspect of the present application, wherein as seen in an axial direction of the reversing valve spool, the third balance groove and the fourth balance groove are both provided in the form of crescent shape, with respective depths of the third balance groove and the fourth balance groove being smaller than that of the second annular pressure sensing groove.

According to one aspect of the present application, the load-sensing multi-way valve work section further comprises: two reversing valve springs respectively arranged in reversing valve spring chambers of the reversing valve bore at two opposite ends of the reversing valve spool, and two spring seats each located between the reversing valve spool and respective one of the two reversing valve springs, wherein each of the reversing valve springs exerts a thrust to the reversing valve spool through respective one of the spring seats, so that when the reversing valve spool is located in a neutral position, each of the two spring seats abuts against respective one of axial stops arranged in the reversing valve bore.

According to one aspect of the present application, wherein communicating passages, each of which being provided between respective end of the two ends of the reversing valve spool and respective one of the spring seats, are arranged to fluidly communicate the first oil return chamber and the second oil return chamber to respective reversing valve spring chambers, respectively, the communicating passages comprising: oil passages provided on respective surfaces of the ends or inside the ends of the reversing valve spool, and gaps provided between respective ends of the reversing valve spool and respective spring seats.

According to one aspect of the present application, wherein each of the spring seats comprises: a first section extending axially and being able to abut against respective one of the axial stops; a second section extending radially inward from the first section and configured to abut against respective one of the ends of the reversing valve spool; a third section located radially inward from the second section and extending radially, the third section configured to space apart from respective one of the ends of the reversing valve spool so as to form a part of respective one of the gaps in a condition that the second section abuts against the respective end; and a fourth section extending axially from the third section, wherein respective one of the two reversing valve springs is sleeved outside the fourth section and abuts against the third section.

According to one aspect of the present application, wherein the reversing valve spool comprises central protrusions extending axially from the two ends of the reversing valve spool, respectively; and in a condition that the second section abuts against respective one of the ends of the reversing valve spool, the central protrusion is received in the fourth section and spaced apart from the fourth section, forming a part of respective one of the gaps.

According to one aspect of the present application, wherein communicating passages, each of which being provided between respective end of the two ends of the reversing valve spool and respective one of the spring seats, are arranged to fluidly communicate the first oil return chamber and the second oil return chamber to respective reversing valve spring chambers, respectively, each of the communicating passages comprising surface oil passage extending axially on a surface of respective end of the reversing valve spool, and wherein the load-sensing multi-way valve work section further comprises a pin fixed in the valve body, an end of which extending into respective surface oil passage, so as to allow the reversing valve spool to move axially while preventing the reversing valve spool from rotating.

According to one aspect of the present application, wherein a pin is further provided in the valve body, an end of which being accommodated in a retaining groove extending axially and located in respective end of the reversing valve spool, so as to allow the reversing valve spool to move axially while preventing the reversing valve spool from rotating.

According to one aspect of the present application, wherein the springless-side control chamber of the compensation valve is communicated to the compensation valve oil outlet chamber through a channel located inside a respective one of the valve spools of the compensation valve, which valve spool moves in response to a pressure difference between the spring-side control chamber and the springless-side control chamber.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EMBODIMENTS OF THE DISCLOSURE

Figure 1:
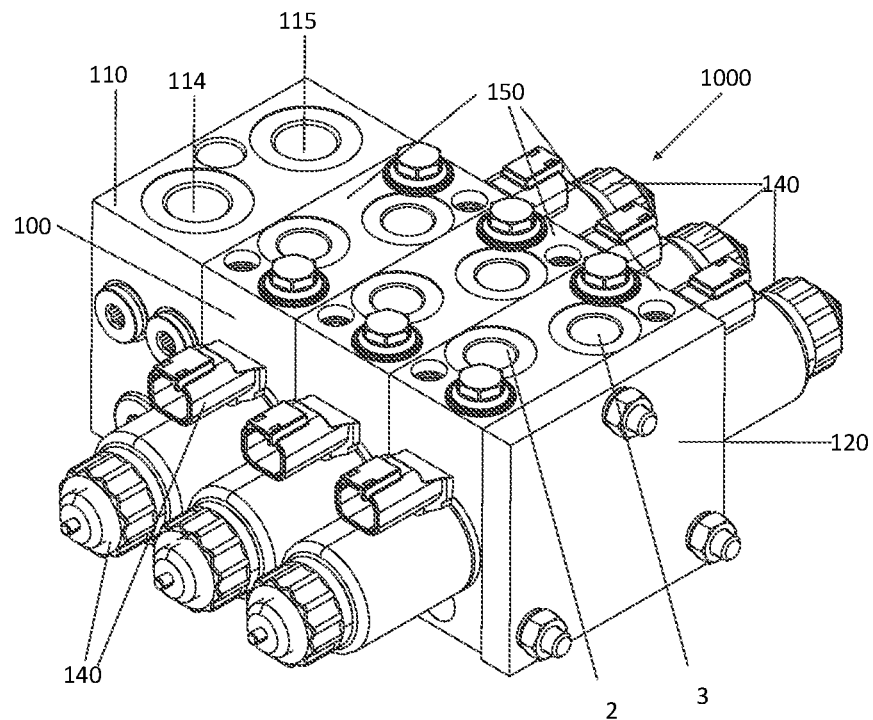
FIG. 1 is a perspective view of a load-sensing multi-way valve, which comprises a load-sensing multi-way valve work section according to an exemplary embodiment of the present application.

The technical solutions of the present disclosure will be further specifically described below by way of embodiments and with reference to the accompanying drawings. In the specification, the same or similar reference numerals indicate the same or similar components. The description of the embodiments of the present disclosure with reference to the accompanying drawings is intended to explain the general inventive concept of the present disclosure, and should not be construed as a limitation of the present disclosure.

In addition, in the following detailed description, numerous specific details are set forth to facilitate explanation so as to provide a comprehensive understanding of embodiments of the disclosure. Obviously, however, one or more embodiments may be practiced without these specific details. In other instances, well-known structures and devices are shown in form of charts so as to simplify FIGS.

As shown in FIG. 1, a load-sensing multi-way valve 1000 comprises: an input section 110, an end section 120, and a plurality of work sections 150 connected in series between the first section 110 and the end section 120. Each of the work sections 150 is provided with connecting holes 21 (see FIG. 2) for being passed through by bolts to connect the work sections 150 between the first section 110 and the end section 120.

The first section 110 comprises first section ports 114 and 115, one of which is configured to receive fluid (e.g., hydraulic oil) and feed the fluid to the work sections 150 and the other of which is configured to discharge the fluid from the work sections 150. The end section 120 is configured to fluidly seal the work sections 150, the first section 110 and the end section 120 are located on opposite sides of the work sections 150, respectively.

Figure 2:
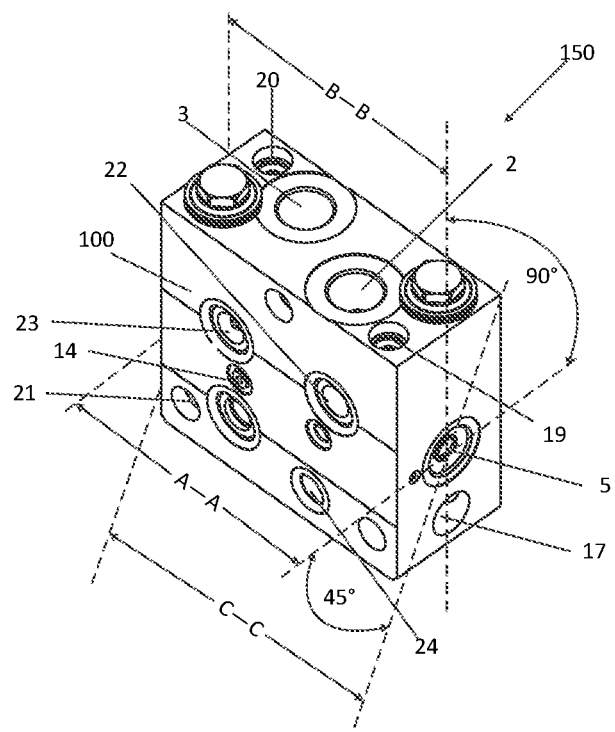
FIG. 2 is a perspective view of the load-sensing multi-way valve work section shown in FIG. 1.

In the following, a single work section 150 will be taken as an example to illustrate a specific structure of the load-sensing multi-way valve work section 150. As shown in FIG. 2, the valve body 100 is further provided with therein: an oil inlet 24, through which working hydraulic oil from one of the first section ports 114 and 115 enters the valve body 100; a first working oil port 2 and a second working oil port 3, one of which receives a hydraulic fluid (i.e., the working hydraulic oil) from the oil inlet 24 and sends the received hydraulic fluid to a load connected to the load-sensing multi-way valve work section 150 and the other of which is used to receive a fluid from the load and feed the received fluid to respective one of a first oil return port 22 and a second oil return port 23, when the reversing valve is driven; and the first oil return port 22 and the second oil return port 23, both of which are communicated to the other of the first section ports 114 and 115. The valve body 100 is also provided therein with holes 19 and 20, which are located near the working oil ports 2 and 3, respectively, and configured to install (i.e., shaped and sized to adapt to installation of) relief valves that release overpressures of the first working oil port 2 and the second working oil port 3. The relief valves are commonly used components, and thus are not repeatedly described here any more.

Figure 3A:
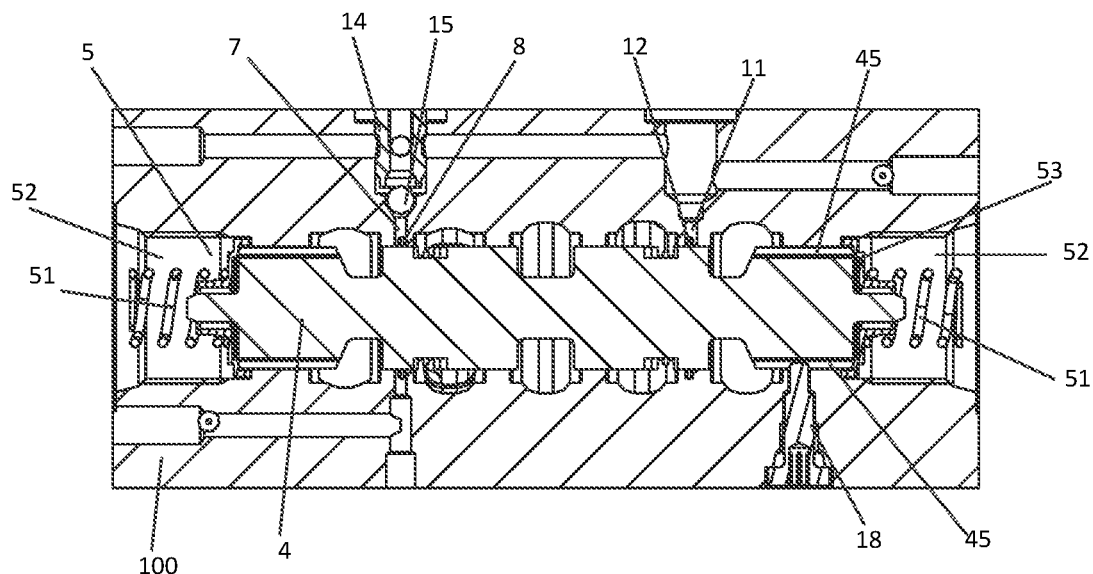
FIG. 3A is a cross-sectional view of the work section taken along a line A-A in FIG. 2 in a condition that a reversing valve spool of the work section is located in a neutral position, and a plane where the line A-A is located is a horizontal plane.
Figure 3B:
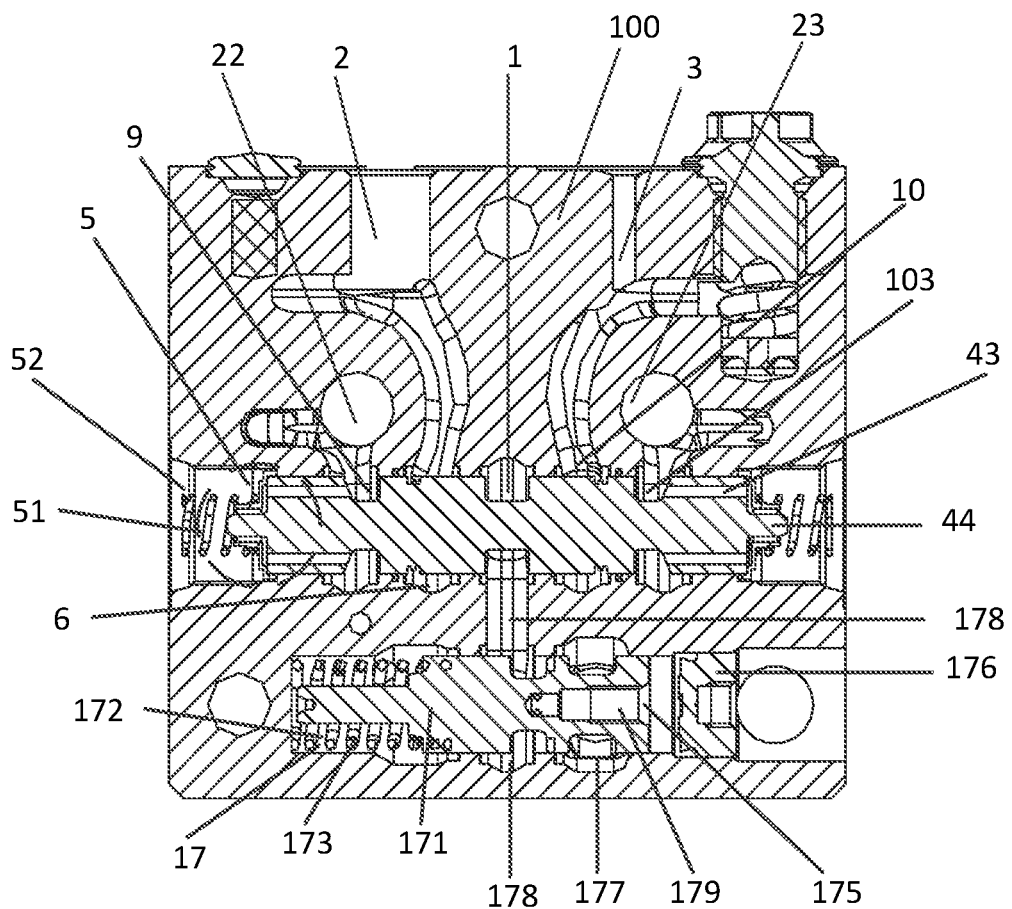
FIG. 3B is a cross-sectional view of the work section taken along a line B-B in FIG. 2 in a condition that the reversing valve spool is located in the neutral position, a plane where the line B-B is located forms an angle of 90° with respect to the plane where the line A-A is located.

As shown in FIG. 3B, a compensation valve and a reversing valve are formed in the valve body 100 of the work section 150. The compensation valve is provided with a compensation valve bore 17 formed in the valve body 100 and a compensation valve spool 171 accommodated in the compensation valve bore 17. The compensation valve bore 17 is formed therein with a compensation valve oil inlet chamber 177, a compensation valve oil outlet chamber 178, a spring-side control chamber 172 and a springless-side control chamber 175. One end of the springless-side control chamber 175 is sealed by a sealing member 176. The hydraulic oil from one of the ports (e.g., port 114) is fed into the compensation valve oil inlet chamber 177 through the oil inlet 24, enters the compensation valve bore 17 through the compensation valve oil inlet chamber 177, and then flows out of the compensation valve bore 17 through the compensation valve oil outlet chamber 178 so as to enter the reversing valve. The springless-side control chamber 175 is communicated to the compensation valve oil outlet chamber 178 through a channel 179 inside the compensation valve spool 171. A spring 173 is provided in the spring-side control chamber 172 to apply a thrust to the compensation valve spool 171, and a load feedback pressure to be described later is also applied to the spring-side control chamber 172. The compensation valve spool 171 moves in response to a pressure difference between the spring-side control chamber 172 and the springless-side control chamber 175, so as to achieve a balance between a pressure in the spring-side control chamber 172 and a pressure in the springless-side control chamber 175, thereby adjusting a position of the compensation valve spool 171 in the compensation valve bore 17, so that the compensation valve spool 171 may adjust a pressure difference between a main oil inlet chamber 1 of the reversing valve and each of the first working oil chamber 6 and the second working oil chamber 10 (see below) and then a flow adjustment is realized.

Figure 3C:
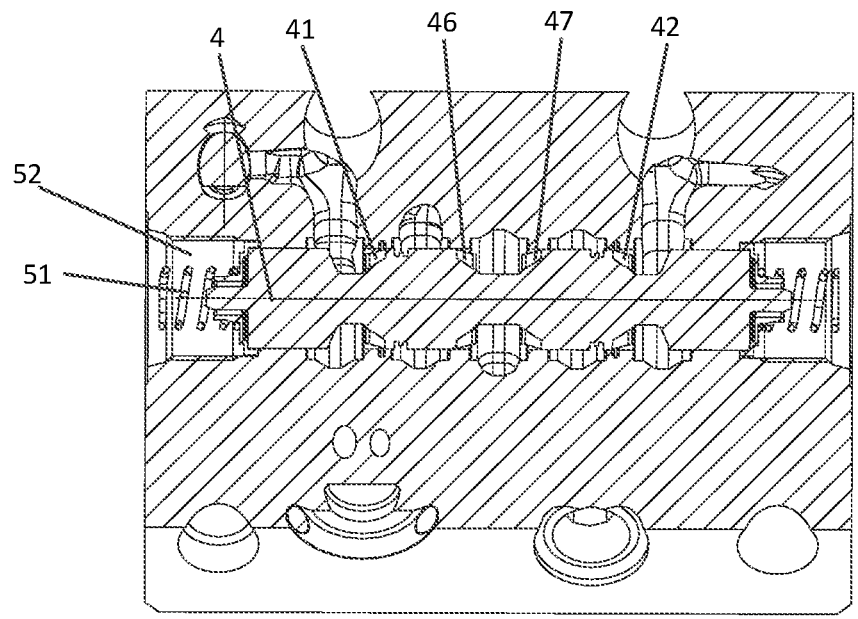
FIG. 3C is a cross-sectional view of the work section taken along a line C-C in FIG. 2 in a condition that the reversing valve spool is located in the neutral position, and the plane where the line C-C is located forms an angle of 45° with respect to the plane where the line A-A is located.

As shown in FIGS. 3A to 3C, the reversing valve is provided with a reversing valve bore 5 formed in the valve body 100 and a reversing valve spool 4 accommodated in the reversing valve bore 5. In the reversing valve bore 5, a first oil return chamber 9, a first load-sensing feedback pressure sensing opening (i.e., pressure tapping or pressure-extraction port) 7, a first working oil chamber 6, a main oil inlet chamber 1, a second working oil chamber 10, a second load-sensing feedback pressure sensing opening 11 and a second oil return chamber 103 are arranged in sequence axially. That is, the first load-sensing feedback pressure sensing opening 7 is located between the first oil return chamber 9 and the first working oil chamber 6, and the second load-sensing feedback pressure sensing opening 11 is located between the second oil return chamber 103 and the second working oil chamber 10. A communicating oil passage is also provided in the valve body 100, so that the main oil inlet chamber 1 communicates with the compensation valve oil outlet chamber 178, the first working oil port 2 is communicated with the first working oil chamber 6 while the second working oil port 3 is communicated to the second working oil chamber 10, respectively. The first oil return port 22 is communicated with the first oil return chamber 9 and the second oil return port 23 is communicated with the second oil return chamber 103, respectively. These communication channels are common in the prior art and thus not described in detail here any more.

The reversing valve spool 4 may be driven by a driver 140 (see FIG. 1) to move in the reversing valve bore 5, and a plurality of recesses are provided on the reversing valve spool 4 to control communications formed in the reversing valve bore 5 among the main oil inlet chamber 1, the first working oil chamber 6, the second working oil chamber 10, the first oil return chamber 9, the second oil return chamber 103, the first load-sensing feedback pressure sensing opening 7 and the second load-sensing feedback pressure sensing opening 11.

The load-sensing multi-way valve work section 150 also defines a feedback passage formed within the valve body 100. The feedback passage is configured to communicate one of the first load-sensing feedback pressure sensing opening 7 and the second load-sensing feedback pressure sensing opening 11 to the spring-side control chamber 172 depending on a position of the reversing valve spool 4 in the reversing valve bore 5. The feedback passage of the present application is completely formed in the valve body without external pipelines and interfaces, simplifying a structure of the work section 150, reducing a volume of the work section 150 and a manufacturing cost of the work section 150.

Figure 6A:
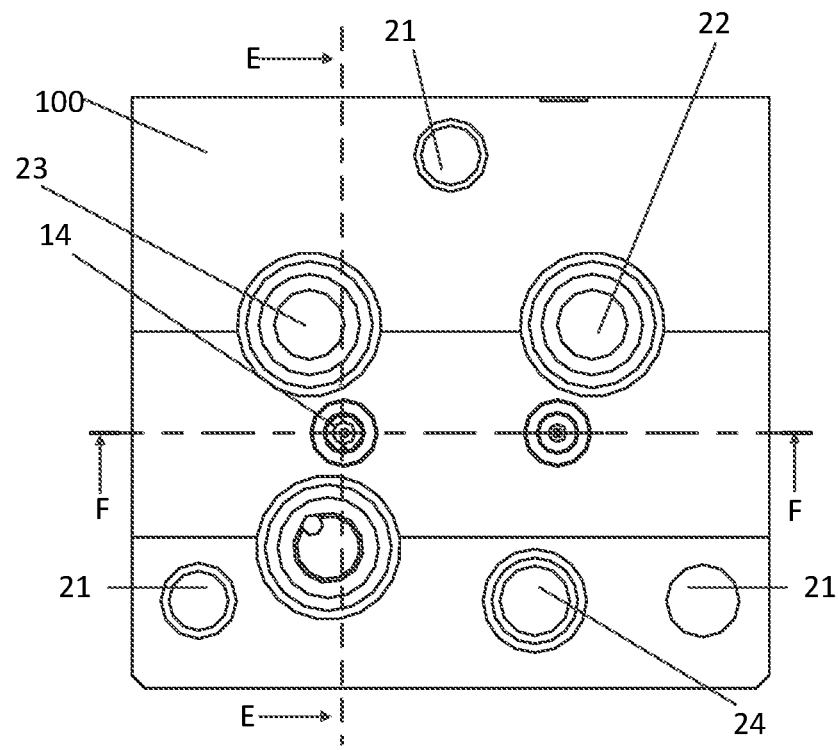
FIG. 6A is a side view of the work section in FIG. 2.
Figure 6B:
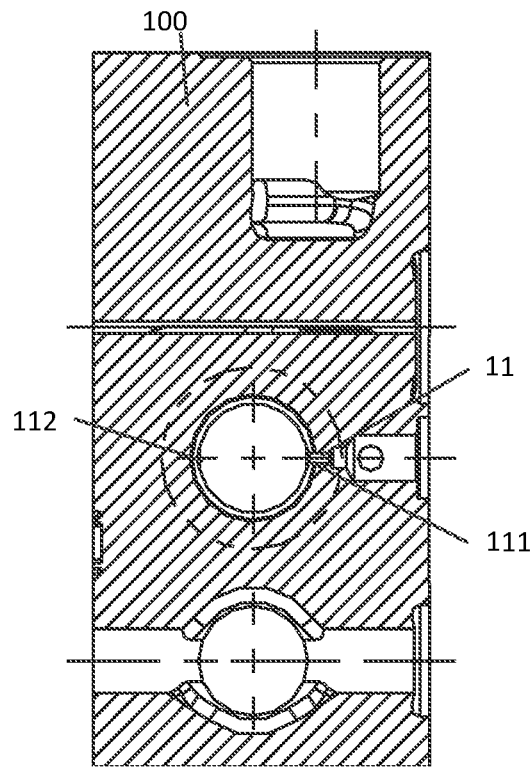
FIG. 6B is a cross-sectional view taken along a line E-E in FIG. 6A.
Figure 6C:
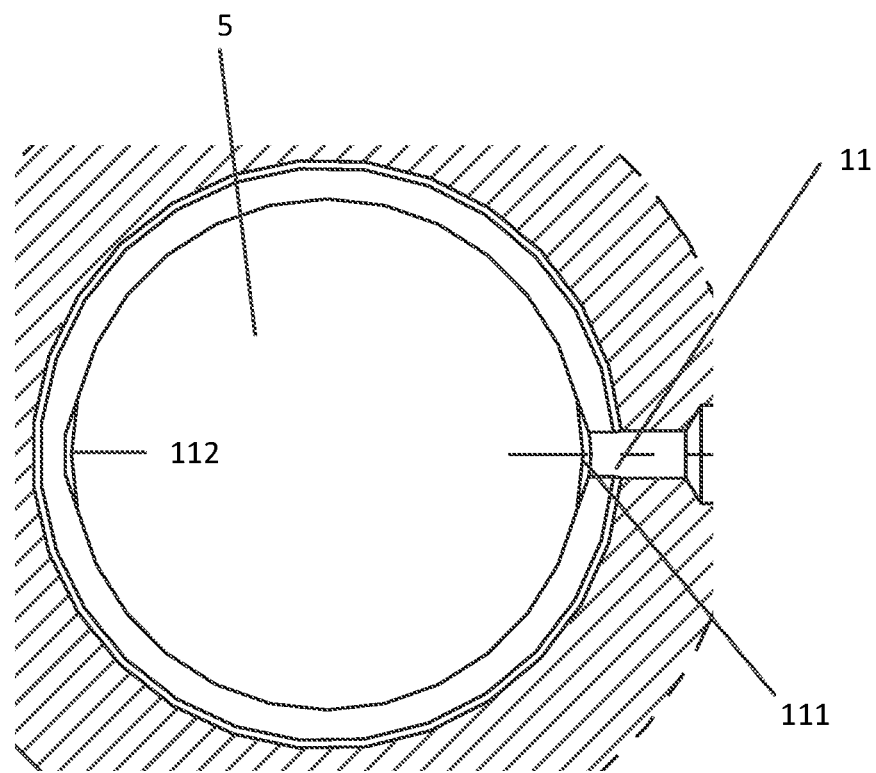
FIG. 6C is an enlarged view of the dashed circle part in FIG. 6B.
Figure 6E:
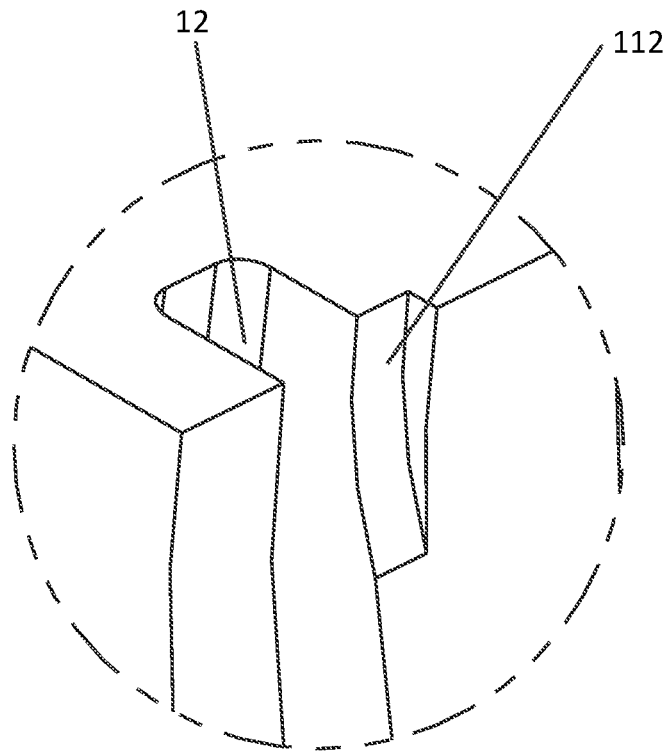
FIG. 6E is an enlarged view of the dashed circle part G in FIG. 6D.
Figure 6D:
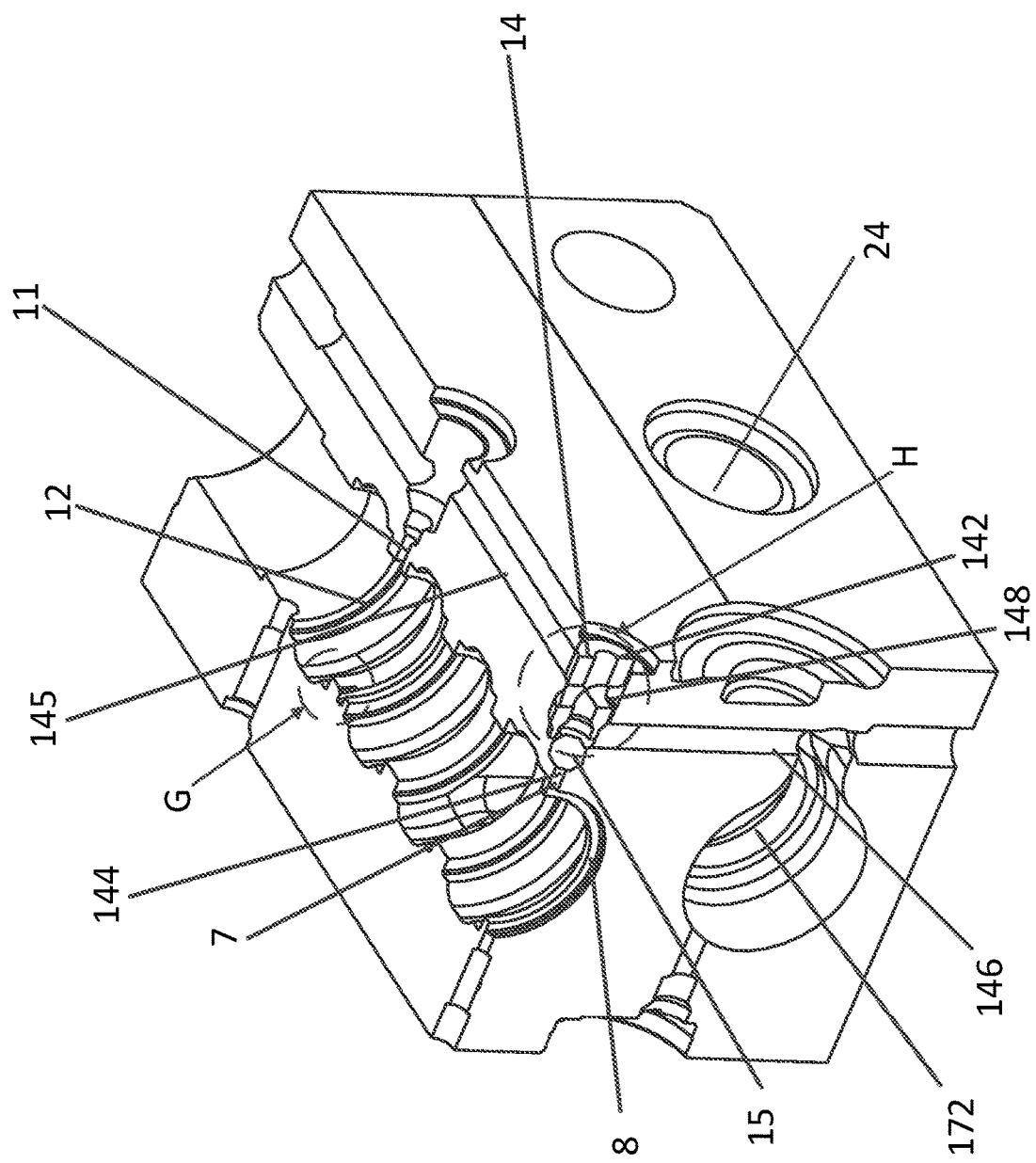
FIG. 6D is a partial cross-sectional perspective view taken along a line F-F in FIG. 6A.

Referring to FIGS. 3A, 6B to 6D, a shuttle valve 14 is provided in the feedback passage. The shuttle valve 14 feeds a larger one of a pressure from the first load-sensing feedback pressure sensing opening 7 and a pressure from the second load-sensing feedback pressure sensing opening 11 to the spring-side control chamber 172. The feedback passage comprises a first feedback port 144 that communicates the first load-sensing feedback pressure sensing opening 7 to the shuttle valve 14, a second feedback port 145 that communicates the second load-sensing feedback pressure sensing opening 11 to the shuttle valve 14, and a third feedback port 146 that communicates the shuttle valve 14 to the spring-side control chamber 172. Wherein, the second feedback port 145 comprises two holes extending perpendicular to each other, so as to communicate the second load-sensing pressure port 11 to the shuttle valve 14. Referring to FIG. 6D, a plane where both the compensation valve spool 171 and the reversing valve spool 4 (more particularly, both axises of the compensation valve spool 171 and the reversing valve spool 4) are located is defined as a reference plane, and a plane where the first feedback port 144 and the second feedback port 145 (more particularly, both axises of the first feedback port 144 and the second feedback port 145) are located is perpendicular to the reference plane, and the third feedback port 146 extends substantially parallel to the reference plane.

Figure 6F:
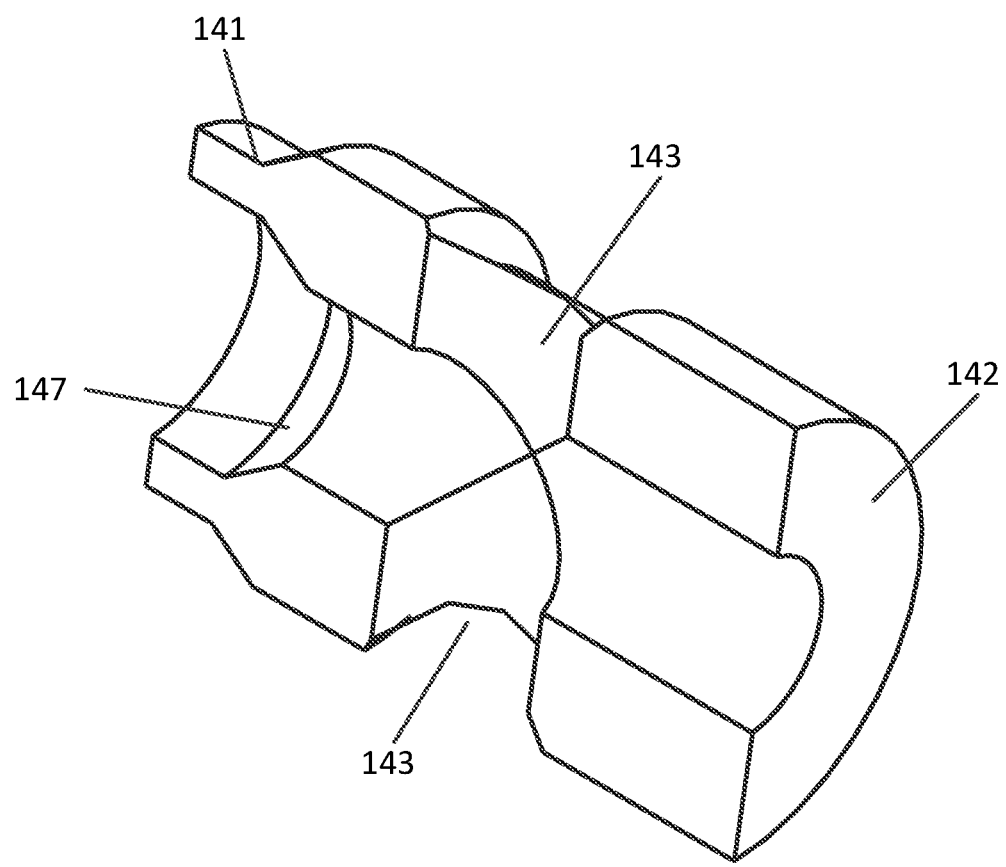
FIG. 6F is an enlarged view of the dashed circle part H in FIG. 6D.

Referring to FIGS. 6D and 6F, the shuttle valve 14 comprises a shuttle valve chamber 148 formed in the valve body 100, a sleeve 141, and a valve element 15. The shuttle valve chamber 148 is communicated to the first feedback port 144 and extends along a direction in which the first feedback port 144 extends.

The sleeve 141 is fixedly arranged in the shuttle valve chamber 148 and is hollow. An end of the sleeve 141 facing towards the first feedback port 144 is provided with an inner step 147, the other end 142 of the sleeve 141 is located at a lateral side of the work section, and two opposite radial openings 143 communicating with the second feedback port 145 are disposed through a side wall of the sleeve 141. Wherein, the third feedback port 146 is communicated to the shuttle valve chamber 148 between the first feedback port 144 and the radial openings 143 without being blocked by the sleeve 141. Specifically, a necking portion is provided at a location corresponding to the third feedback port 146 on the sleeve 141, so that the third feedback port 146 is communicated to the shuttle valve chamber 148.

The valve element 15 is located between the first feedback port 144 and the inner step 147 of the sleeve 141, and may move under a larger one of a pressure from the first feedback port 144 and a pressure from the second feedback port 145, thereby closing the first feedback port 144 or the inner step 147, so that the second feedback port 145 or the first feedback port 144 is communicated with the third feedback port 146. Thereby, when the pressure from the first feedback port 144 is larger than the pressure from the second feedback port 145, only the first feedback port 144 is communicated to the third feedback port 146; when the pressure from the second feedback port 145 is larger than the pressure from the first feedback port 144, only the second feedback port 145 is communicated to the third feedback port 146.

The working principle of the reversing valve will be described below with reference to FIGS. 3A to 5C.

Figure 7:
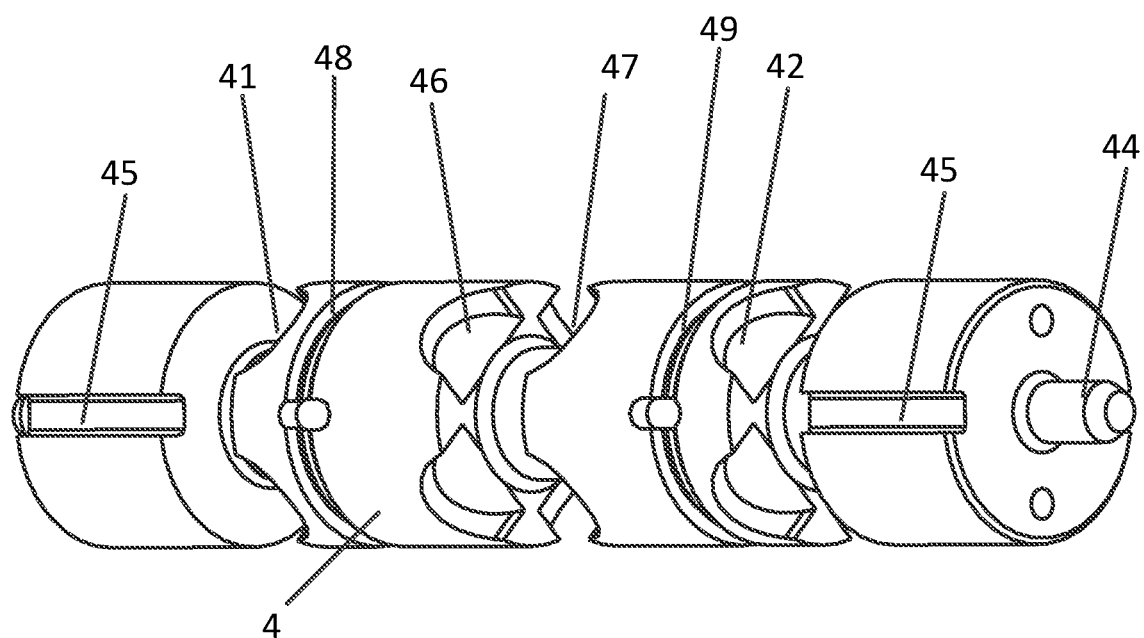
FIG. 7 is a perspective view of a reversing valve spool according to an exemplary embodiment of the present application.

Referring to FIGS. 3A to 3C, when the reversing valve spool 4 is located in the neutral position, the first load-sensing feedback pressure sensing opening 7 is communicated to the first oil return chamber 9 through a first annular pressure sensing groove 8 and a first throttle groove 41 which is formed on the reversing valve spool 4 (see FIGS. 3C and 7), and the second load-sensing feedback pressure sensing opening 11 is communicated to the second oil return chamber 103 through a second annular pressure sensing groove 12 and a second throttle groove 42 which is formed on the reversing valve spool 4 (see FIGS. 3C and 7). Neither the first working oil chamber 6 nor the second working oil chamber 10 is communicated with the main oil inlet chamber 1. In the illustrated embodiment, when the reversing valve spool 4 is located in the neutral position, neither the first working oil chamber 6 nor the second working oil chamber 10 is communicated with the oil return chambers 9, 103; alternatively, the working oil chambers 6, 10 may also be disposed to be communicated to the oil return chambers 9, 103, respectively; and these embodiments are all within the scope of the present application.

Figure 4A:
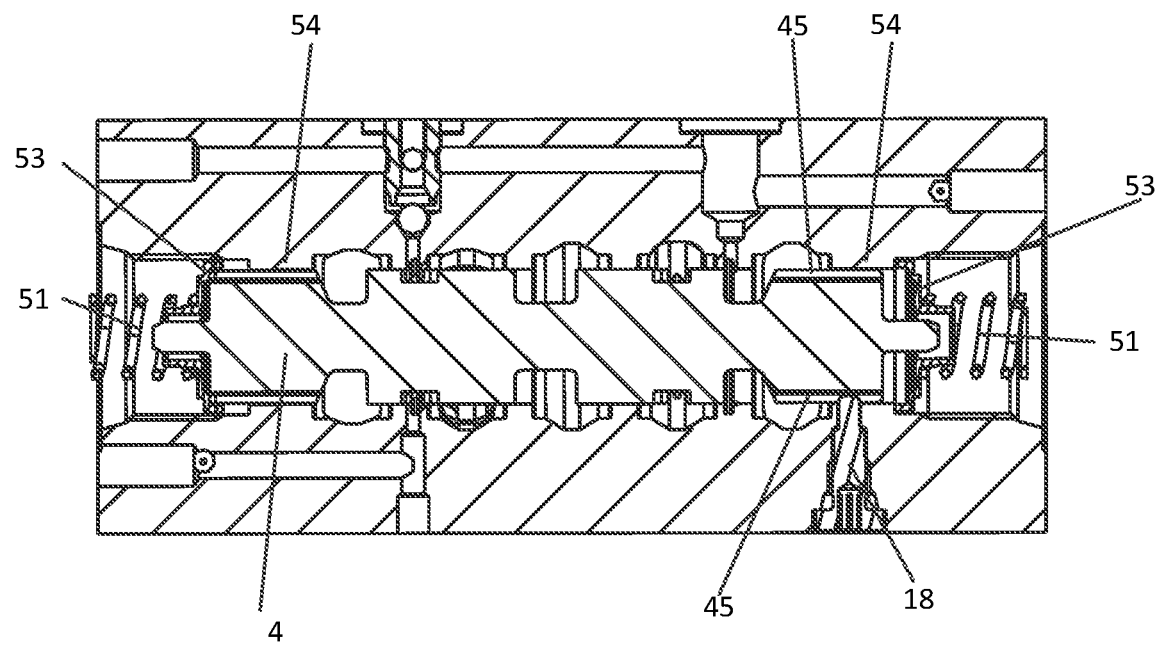
FIG. 4A is a cross-sectional view of the work section taken along the line A-A in FIG. 2 in a condition that the reversing valve spool is located in a first working position.
Figure 4B:
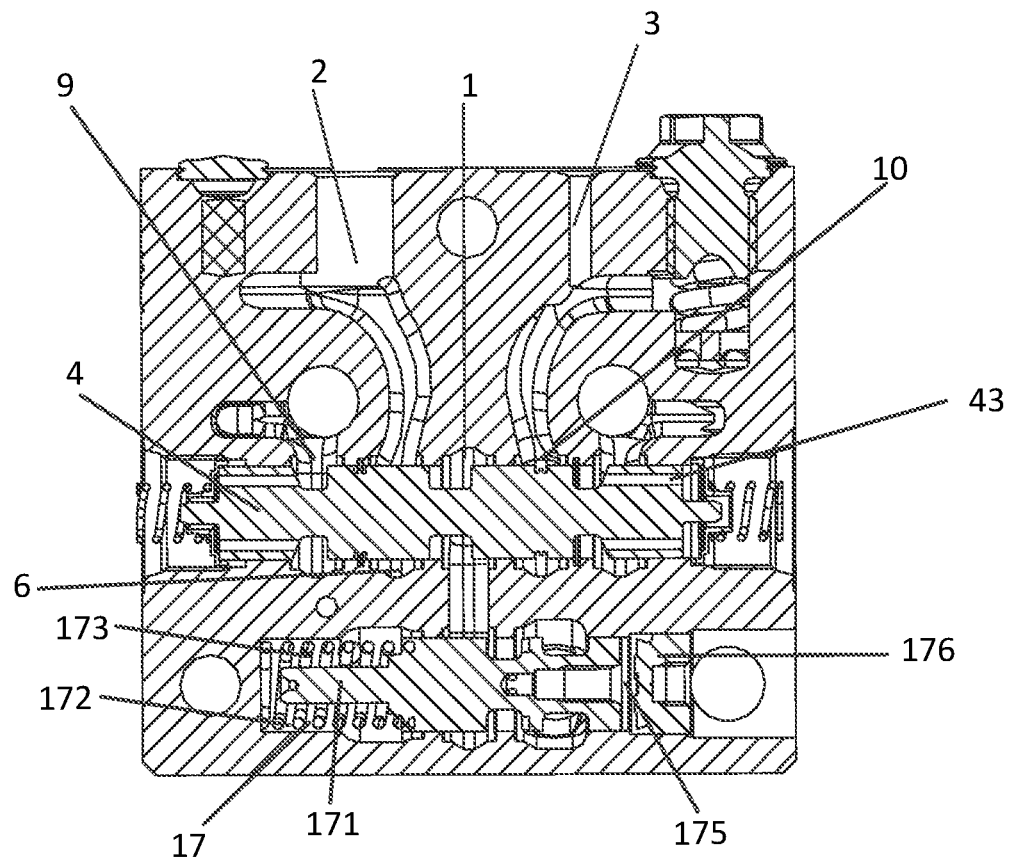
FIG. 4B is a cross-sectional view of the work section taken along the line B-B in FIG. 2 in a condition that the reversing valve spool is located in the first working position.
Figure 4C:
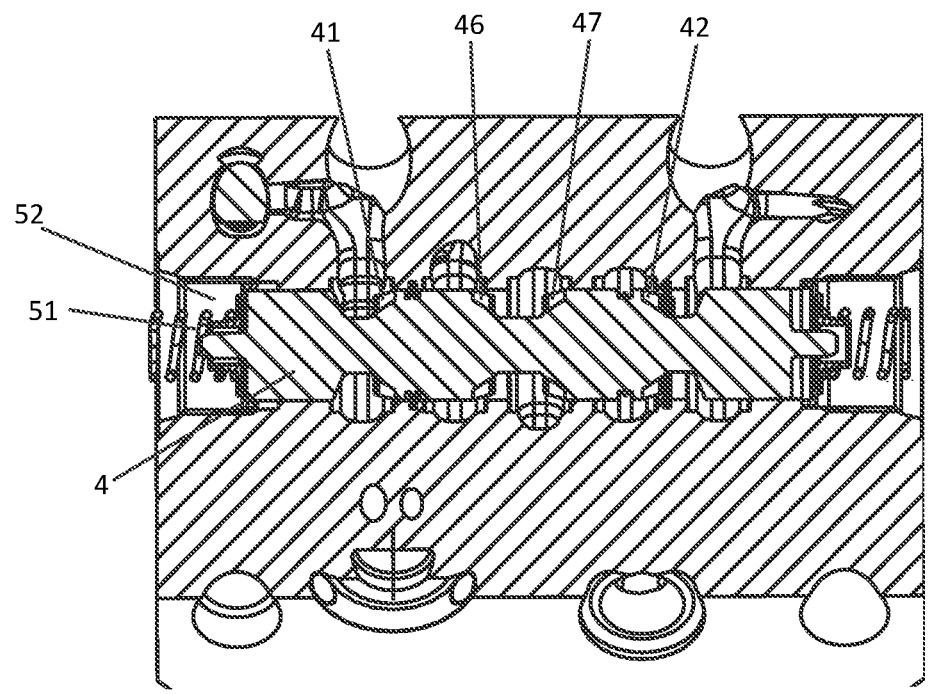
FIG. 4C is a cross-sectional view of the work section taken along the line C-C in FIG. 2 in a condition that the reversing valve spool is located in the first working position.

Referring to FIGS. 4A to 4C, when the reversing valve is located in the first working position, the reversing valve spool 4 moves towards a first side, the main oil inlet chamber 1 communicates with the first working oil chamber 6 through a third throttle groove 46, and a flow rate is adjusted by the third throttle groove 46 (see FIG. 7), and the main oil inlet chamber 1 is communicated to the first load-sensing feedback pressure sensing opening 7 through a groove 48 on the reversing valve spool. The second working oil chamber 10 and the second load-sensing feedback pressure sensing opening 11 communicate with the second oil return chamber 103 through the throttle groove 42 and communicating portions on the valve spool communicating to the throttle groove 42.

Figure 5A:
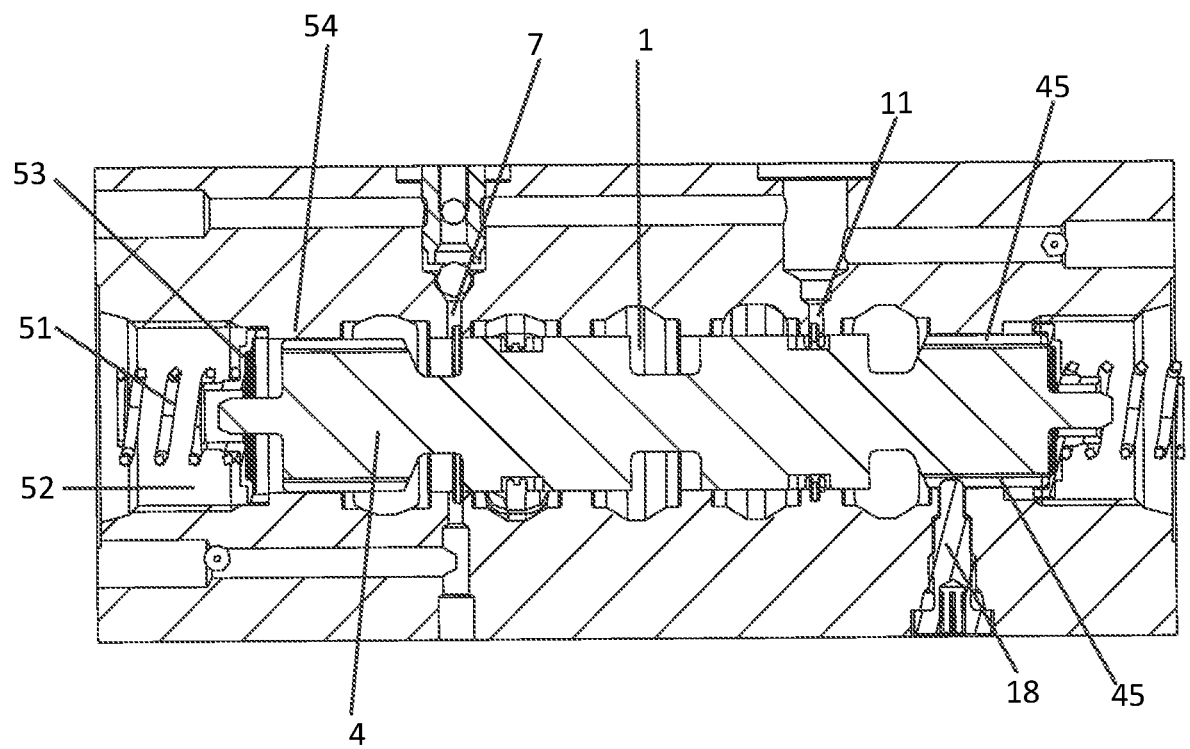
FIG. 5A is a cross-sectional view of the work section taken along the line A-A in FIG. 2 in a condition that the reversing valve spool is located in a second working position.
Figure 5B:
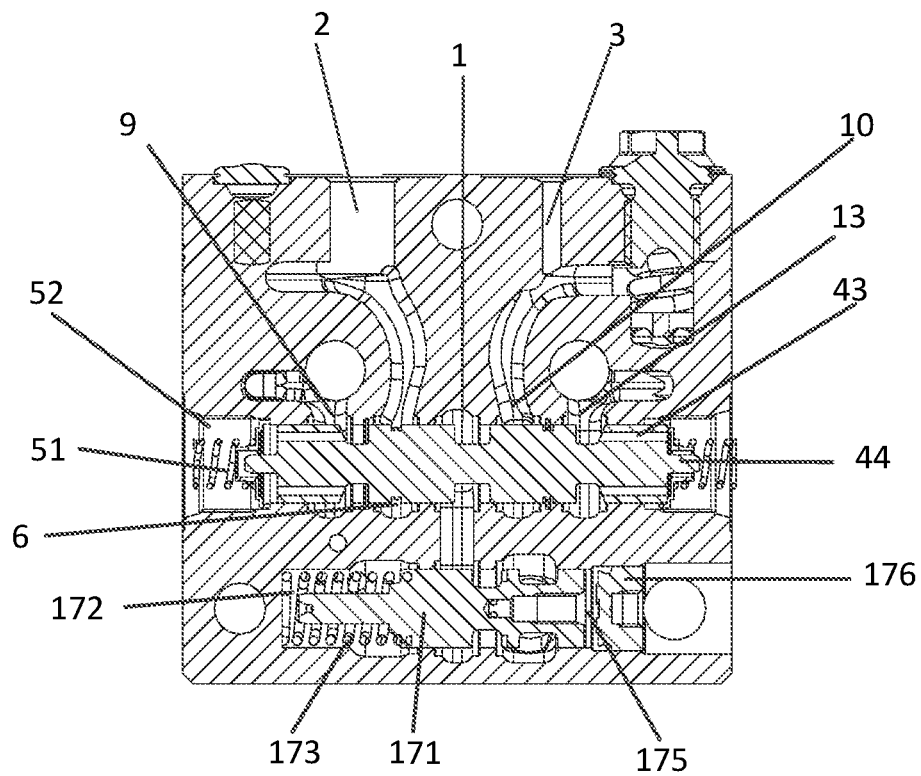
FIG. 5B is a cross-sectional view of the work section taken along the line B-B in FIG. 2 in a condition that the reversing valve spool is located in the second working position.
Figure 5C:
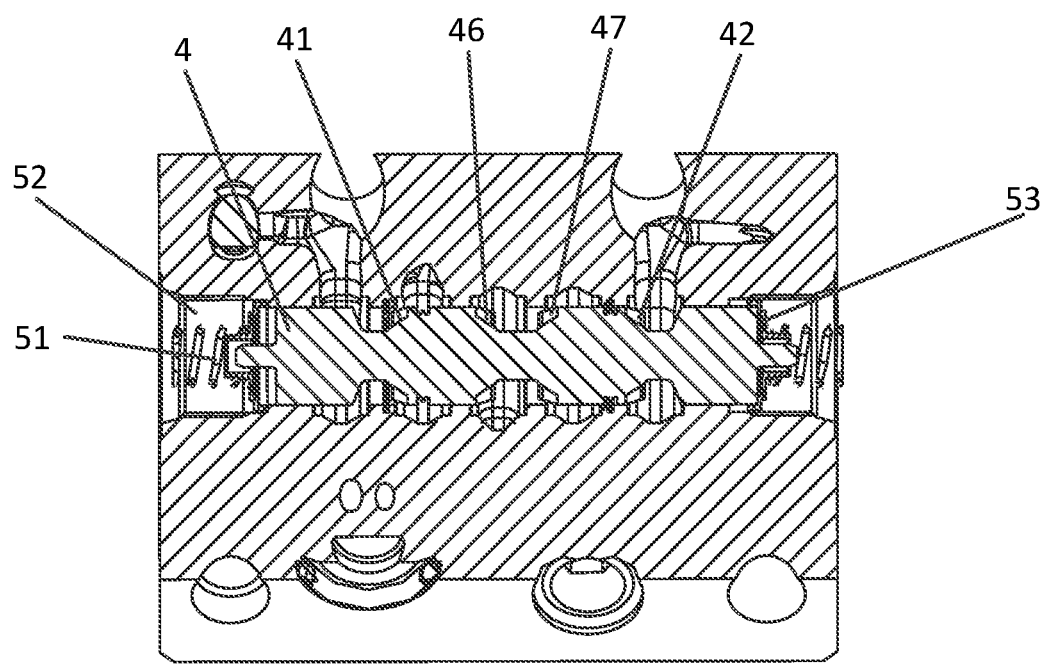
FIG. 5C is a cross-sectional view of the work section taken along the line C-C in FIG. 2 in a condition that the reversing valve spool is located in the second working position.

Referring to FIGS. 5A to 5C, when the reversing valve is located in a second working position, the reversing valve spool 4 moves towards a second side opposite to the first side, and the main oil inlet chamber 1 is communicated to the second working oil chamber 10 through a fourth throttle groove 47, and the flow rate is adjusted by the fourth throttle groove 47 (see FIG. 7). The main oil inlet chamber 1 is communicated to the second load-sensing feedback pressure sensing opening 11 through a groove 49 on the reversing valve spool. The first working oil chamber 6 and the first load-sensing feedback pressure sensing opening 7 communicate with the first oil return chamber 9 through the throttle groove 41 and communicating portions on the valve spool communicated to the throttle groove 41.

Therefore, when the reversing valve spool is located in the neutral position, the first load-sensing feedback pressure sensing opening 7 and the second load-sensing feedback pressure sensing opening 11 are both relieved. When the reversing valve spool is located in the first working position, the first load-sensing feedback pressure sensing opening 7 transmits a pressure from the first working oil chamber 6 (which is larger than a pressure of the oil return chamber from the second load-sensing feedback pressure sensing opening 11) to the shuttle valve 14, and then the pressure is transmitted to the spring-side control chamber 172 of the compensation valve. When the reversing valve spool is located in the second working position, the second load-sensing feedback pressure sensing opening 11 transmits a pressure from the second working oil chamber 10 (which is larger than a pressure of the oil return chamber from the first load-sensing feedback pressure sensing opening 7) to the shuttle valve 14 and then the pressure is transmitted to the spring-side control chamber 172 of the compensation valve. The embodiments of the present application realize an independent pressure relief of two working oil chambers in a relatively compact space, and may realize an unloading of a neutral load-sensing oil pressure.

As shown in FIGS. 3A to 3C, the load-sensing multi-way valve work section 150 further comprises: two reversing valve springs 51 respectively arranged in reversing valve spring chambers 52 of the reversing valve bore 5 at two opposite ends of the reversing valve spool 4 and the two spring seats 53 each located between the reversing valve spool 4 and respective one of the two reversing valve springs 51, wherein each of the reversing valve springs 51 exerts a thrust to the reversing valve spool 4 through respective one of the spring seats 53, so that when the reversing valve spool 4 is located in a neutral position, each of the two spring seats 53 abuts against respective one of axial stops 54 arranged in the reversing valve bore 5. As a result, the reversing valve spool 4 may be accurately maintained at the neutral position.

Communicating passages, each of which being provided between respective end of the two ends of the reversing valve spool 4 and respective one of the spring seats 53, are arranged to fluidly communicate the first oil return chamber 9 and the second oil return chamber 103 to respective reversing valve spring chambers 52 respectively, so that the reversing valve spring chambers 52 relieves pressure via the oil return chambers 9, 103 respectively. The communicating passages comprise: oil passages 45 provided on respective surfaces of the ends or oil passages 43 inside the ends of the reversing valve spool 4 (FIGS. 3A, 4A, and 5A show the oil passages 45, FIGS. 3B, 4B, and 5B show the oil passages 43, the person skilled in the art knows that one type or both types of oil passages 43, 45 may be used) and gaps 530 provided between respective ends of the reversing valve spool 4 and respective spring seats 53, as shown in FIG. 3D.

Figure 3D:
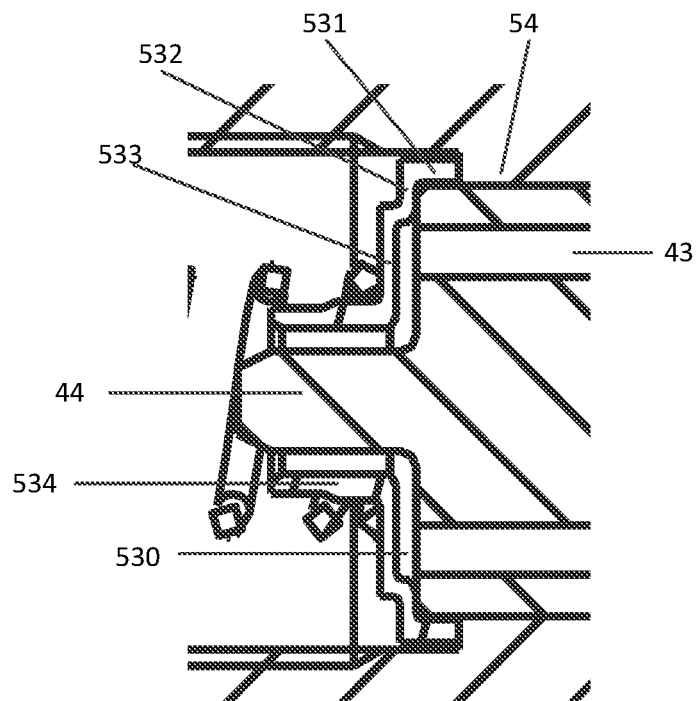
FIG. 3D is an enlarged view of a dashed circle part in FIG. 3B, showing an end of the reversing valve spool.

As shown in FIG. 3D, each of the spring seats 53 comprises: a first section 531, which extends axially and may abut against respective one of the axial stops 54; a second section 532, which extends radially inwardly from the first section 531 and configured to abut against respective one of the ends of the reversing valve spool 4; a third section 533, which is located radially inward from the second section 532 and extends radially, when the second section 532 abuts against respective one of the ends of the reversing valve spool 4, the third section 533 is spaced apart from the respective end to form a part of respective one of the gaps 530; and a fourth section 534 extending axially from the third section 533, respective one of the two reversing valve springs 51 is sleeved outside the fourth section 534 and abuts against the third section 533.

As shown in FIG. 3D, the reversing valve spool 4 comprises central protrusions 44 respectively extending axially from both ends of the reversing valve spool 4, and the central protrusions 44 may be formed integrally with or separately from the reversing valve spool 4. When the second section 532 abuts against respective one of the ends of the reversing valve spool 4, the central protrusion 44 is received in the fourth section 534 and is spaced apart from the fourth section 534, forming a part of respective one of the gaps 530.

Referring to FIGS. 3A and 7, when the communicating passages comprise the surface oil passage 45 axially extending on the surface of respective end of the ends of the reversing valve spool 4, the load-sensing multi-way valve work section 150 further comprises a pin 18 fixed in the valve body 100. An end of the pin 18 extends into respective surface oil passage 45, thereby allowing the reversing valve spool 4 to move axially while preventing the reversing valve spool 4 from rotating. By preventing the reversing valve spool 4 from rotating, pressure ports in the reversing valve spool 4 may be used to replace circumferential load-sensing feedback chamber(s); grooves/holes that are not communicated to each other but overlap with each other axially (circumferentially staggered with respect to each other) may be arranged in the reversing valve spool 4 and the reversing valve bore 5 respectively, shortening axial sizes of the reversing valve spool 4 and the entire valve body, and simplifying designs of the valve body and the valve spool.

The surface oil passage 45 may also be used only as a retaining groove for accommodating the end of the pin 18, and in this case no hydraulic oil flows through the surface oil passage 45.

Referring to FIG. 3A, a first annular pressure sensing groove 8 communicating with the first load-sensing feedback pressure sensing opening 7 and a second annular pressure sensing groove 12 communicating with the second load-sensing feedback pressure sensing opening 11 are both provided in the reversing valve bore 5. The annular pressure sensing grooves 8, 12 not only balance forces along a circumferential direction of the reversing valve spool 4 so as to reduce a friction between the reversing valve spool 4 and a wall of the reversing valve bore 5, but also assist in installing a load pressure overflow valve in the oil passage on a side of the reversing valve spool 4 opposite to the pressure ports 7, 11, and further facilitate communication between the pressure ports 7, 11 and the oil return chambers 9, 103 respectively when the reversing valve spool 4 is located in the neutral position, as described below. It may be understood that, unlike the above-mentioned embodiment, rather than providing the annular pressure sensing grooves on the reversing valve bore 5, alternatively the feedback pressure is introduced to respective one of the pressure ports 7 and 11 through a flow channel inside the reversing valve spool 4. Since the reversing valve spool 4 does not rotate, an alignment between the flow channel inside the reversing valve spool 4 and respective one of the pressure ports 7, 11 may be achieved without disposing any annular groove on the reversing valve bore 5.

For the sake of brevity, only the third balance groove 111 and the fourth balance groove 112 are shown in the FIGS., and arrangements of the first balance groove and the second balance groove are similar to that of the third balance groove 111 and the fourth balance groove 112.

The first balance groove (not shown in the FIGS.) is provided at a location locally in an inner wall of the reversing valve bore 5 adjacent to the first annular pressure sensing groove 8. A sum of axial dimensions of the first annular pressure sensing groove 8 and the first balance groove is larger than that of the first load-sensing feedback pressure sensing opening 7, and a symmetrical second balance groove is provided at a location, radially opposite to and symmetric with the first balance groove, in the inner wall of the reversing valve bore 5.

When viewed along an axial direction of the reversing valve spool 4, the first balance groove and the second balance groove are both provided in the form of crescent shape, and respective depths (i.e., the radial depths) of the first balance groove and the second balance groove are smaller than that of the first annular pressure sensing groove 8.

As shown in FIGS. 6A to 6D, similarly, a third balance groove 111 is partially provided at a location locally in the inner wall of the reversing valve bore 5 adjacent to the second annular pressure sensing groove 12. A sum of axial dimensions of the second annular pressure sensing groove 12 and the third balance groove 111 is larger than an axial dimension of the second load-sensing feedback pressure sensing opening 11, a symmetrical fourth balance groove 112 is provided at a location, radially opposite to and symmetric with the third balance groove 111, in the inner wall of the reversing valve bore 5 (see FIG. 6C).

When viewed along the axial direction of the reversing valve spool 4, the third balance groove 111 and the fourth balance groove 112 are both provided in the form of crescent shape, and depths (i.e., the radial depths) of the third balance groove 111 and the fourth balance groove 112 are smaller than that of the second annular pressure sensing groove 12, see FIG. 6E.

The first to fourth balance grooves facilitate balancing the forces in the circumferential direction of the reversing valve spool 4 so as to reduce the friction between the reversing valve spool 4 and the wall of the reversing valve bore 5.

It will be understood by those skilled in the art that the embodiments described above are exemplary and may be modified by those skilled in the art, and the structures described in the various embodiments may be combined freely without conflict in structure or principle thereof.

After explaining the preferable embodiments of the present disclosure in detail, the person skilled in the art may distinctly may find out that various changes and modifications may be made without departing from the scope and spirit of the appended claims. The present disclosure is not limited to the embodiments of the exemplary embodiments set forth in the specification.

What is claimed is:

1. A load-sensing multi-way valve work section comprising a valve body, which comprises a compensation valve and a reversing valve both formed therein,
   wherein the compensation valve is provided with a compensation valve bore formed in the valve body and a compensation valve spool accommodated in the compensation valve bore, with a compensation valve oil inlet chamber, a compensation valve oil outlet chamber, a spring-side control chamber and a springless-side control chamber all being formed inside the compensation valve bore;
   wherein the reversing valve is provided with a reversing valve bore formed in the valve body and a reversing valve spool accommodated in the reversing valve bore, the reversing valve spool being configured to control communications among a main oil inlet chamber, a first working oil chamber, a second working oil chamber, a first oil return chamber, a second oil return chamber, a first load-sensing feedback pressure sensing opening and a second load-sensing feedback pressure sensing opening formed in the reversing valve bore, the compensation valve oil outlet chamber being communicated to the main oil inlet chamber;
   wherein the load-sensing multi-way valve work section also defines a feedback passage formed within the valve body, the feedback passage being configured to communicate one of the first and second load-sensing feedback pressure sensing openings with the spring-side control chamber depending on a position of the reversing valve spool in the reversing valve bore;
   wherein a first annular pressure sensing groove communicating with the first load-sensing feedback pressure sensing opening and a second annular pressure sensing groove communicating with the second load-sensing feedback pressure sensing opening are both provided in the reversing valve bore;
   wherein in a condition that the reversing valve spool is located in a neutral position, the first load-sensing feedback pressure sensing opening is communicated with the first oil return chamber through the first annular pressure sensing groove and a first throttle groove which is formed on the reversing valve spool, and the second load-sensing feedback pressure sensing opening is communicated with the second oil return chamber through the second annular pressure sensing groove and a second throttle groove which is formed on the reversing valve spool;
   wherein a third balance groove is provided at a location locally in an inner wall of the reversing valve bore adjacent to the second annular pressure sensing groove, with a sum of respective axial dimensions of the second annular pressure sensing groove and the third balance groove being larger than an axial dimension of the second load-sensing feedback pressure sensing opening; and
   wherein a fourth balance groove is provided at a location, radially opposite to and symmetric with the third balance groove, in the inner wall of the reversing valve bore.

2. The load-sensing multi-way valve work section according to claim 1, wherein an oil inlet port, a first working oil port, a second working oil port, a first oil return port and a second oil return port are formed in the valve body and open to outside of the valve body, the oil inlet port is communicated with the compensation valve oil inlet chamber, the first working oil port is communicated with the first working oil chamber while the second working oil port is communicated with the second working oil chamber, respectively, and the first oil return port is communicated with the first oil return chamber while the second oil return port is communicated with the second oil return chamber, respectively.

3. The load-sensing multi-way valve work section according to claim 1, wherein the first oil return chamber, the first load-sensing feedback pressure sensing opening, the first working oil chamber, the main oil inlet chamber, the second working oil chamber, the second load-sensing feedback pressure sensing opening and the second oil return chamber are arranged in sequence axially in the reversing valve bore.

4. The load-sensing multi-way valve work section according to claim 1, in a condition that the reversing valve spool is located in a neutral position, neither the first working oil chamber nor the second working oil chamber is communicated to the main oil inlet chamber, the first load-sensing feedback pressure sensing opening is communicated with the first oil return chamber, and the second load-sensing feedback pressure sensing opening is communicated with the second oil return chamber;
   in a condition that the reversing valve is located in a first working position, the reversing valve spool moves towards a first side, the main oil inlet chamber is communicated with both the first working oil chamber and the first load-sensing feedback pressure sensing opening, the second working oil chamber and the second load-sensing feedback pressure sensing opening are both communicated with the second oil return chamber; and
   in a condition that the reversing valve is located in a second working position, the reversing valve spool moves towards a second side, the main oil inlet chamber is communicated with both the second working oil chamber and the second load-sensing feedback pressure sensing opening, the first working oil chamber and the first load-sensing feedback pressure sensing opening are both communicated with the first oil return chamber.

5. The load-sensing multi-way valve work section according to claim 1, further comprising a shuttle valve arranged in the feedback passage and configured to feed a larger one of a pressure from the first load-sensing feedback pressure sensing opening and a pressure from the second load-sensing feedback pressure sensing opening to the spring-side control chamber.

6. The load-sensing multi-way valve work section according to claim 5, wherein the feedback passage comprises a first feedback port communicating the first load-sensing feedback pressure sensing opening to the shuttle valve, a second feedback port communicating the second load-sensing feedback pressure sensing opening to the shuttle valve and a third feedback port communicating the shuttle valve to the spring-side control chamber, and
   wherein, a plane where both the compensation valve spool and the reversing valve spool are located is defined as a reference plane, and a plane where both the first feedback port and the second feedback port are located is perpendicular to the reference plane, and the third feedback port extends substantially parallel to the reference plane.

7. The load-sensing multi-way valve work section according to claim 6, wherein the shuttle valve comprises:
a shuttle valve chamber formed in the valve body, the shuttle valve chamber being communicated to the first feedback port and extending along a direction in which the first feedback port extends;
a sleeve fixedly arranged in the shuttle valve chamber, with an inner step being provided on a side of the sleeve facing towards the first feedback port, and a radial opening being arranged through a side wall of the sleeve to communicate with the second feedback port, wherein the third feedback port is communicated to the shuttle valve chamber between the first feedback port and the radial opening without being blocked by the sleeve; and
a valve element located between the first feedback port and the inner step of the sleeve and configured to move under a larger pressure of the first feedback port and the second feedback port, so as to block one of the first feedback port and the inner step at a time, such that the second feedback port is communicated with the third feedback port in case that the first feedback port is blocked or the first feedback port is communicated with the third feedback port in case that the inner step is blocked.

8. The load-sensing multi-way valve work section according to claim 1, wherein a first balance groove is provided at a location locally in an inner wall of the reversing valve bore adjacent to the first annular pressure sensing groove, with a sum of respective axial dimensions of the first annular pressure sensing groove and the first balance groove being larger than an axial dimension of the first load-sensing feedback pressure sensing opening; and
wherein a second balance groove is provided at a location, radially opposite to and symmetric with the first balance groove, in the inner wall of the reversing valve bore.

9. The load-sensing multi-way valve work section according to claim 8, wherein as seen in an axial direction of the reversing valve spool, the first balance groove and the second balance groove are both provided in the form of crescent shape, with respective depths of the first balance groove and the second balance groove being smaller than that of the first annular pressure sensing groove.

10. The load-sensing multi-way valve work section according to claim 1, wherein as seen in an axial direction of the reversing valve spool, the third balance groove and the fourth balance groove are both provided in the form of crescent shape, with respective depths of the third balance groove and the fourth balance groove being smaller than that of the second annular pressure sensing groove.

11. The load-sensing multi-way valve work section according to claim 1, further comprising:
two reversing valve springs respectively arranged in reversing valve spring chambers of the reversing valve bore at two opposite ends of the reversing valve spool, and
two spring seats each located between the reversing valve spool and respective one of the two reversing valve springs, wherein each of the reversing valve springs exerts a thrust to the reversing valve spool through respective one of the spring seats, so that when the reversing valve spool is located in a neutral position, each of the two spring seats abuts against respective one of axial stops arranged in the reversing valve bore.

12. The load-sensing multi-way valve work section according to claim 11, wherein communicating passages, each of which being provided between respective end of the two ends of the reversing valve spool and respective one of the spring seats, are arranged to fluidly communicate the first oil return chamber and the second oil return chamber to respective reversing valve spring chambers, respectively, the communicating passages comprising: oil passages provided on respective surfaces of the ends or oil passages inside the ends of the reversing valve spool, and gaps provided between respective ends of the reversing valve spool and respective spring seats.

13. The load-sensing multi-way valve work section according to claim 12, wherein each of the spring seats comprises:
a first section extending axially and being able to abut against respective one of the axial stops;
a second section extending radially inward from the first section and configured to abut against respective one of the ends of the reversing valve spool;
a third section located radially inward from the second section and extending radially, the third section configured to space apart from respective one of the ends of the reversing valve spool so as to form a part of respective one of the gaps in a condition that the second section abuts against the respective end; and
a fourth section extending axially from the third section, wherein respective one of the two reversing valve springs is sleeved outside the fourth section and abuts against the third section.

14. The load-sensing multi-way valve work section according to claim 13, wherein the reversing valve spool comprises central protrusions extending axially from the two ends of the reversing valve spool, respectively; and in a condition that the second section abuts against respective one of the ends of the reversing valve spool, the central protrusion is received in the fourth section and spaced apart from the fourth section, forming a part of respective one of the gaps.

15. The load-sensing multi-way valve work section according to claim 11, wherein communicating passages, each of which being provided between respective end of the two ends of the reversing valve spool and respective one of the spring seats, are arranged to fluidly communicate the first oil return chamber and the second oil return chamber to respective reversing valve spring chambers, respectively, each of the communicating passages comprising surface oil passage extending axially on a surface of respective end of the reversing valve spool, and
wherein the load-sensing multi-way valve work section further comprises a pin fixed in the valve body, an end of which extending into respective surface oil passage, so as to allow the reversing valve spool to move axially while preventing the reversing valve spool from rotating.

16. The load-sensing multi-way valve work section according to claim 1, wherein a pin is further provided in the valve body, an end of which being accommodated in a retaining groove extending axially and located in respective end of the reversing valve spool, so as to allow the reversing valve spool to move axially while preventing the reversing valve spool from rotating.

17. The load-sensing multi-way valve work section according to claim 1, wherein the springless-side control chamber of the compensation valve is communicated to the compensation valve oil outlet chamber through a channel located inside the valve spool of the compensation valve, which valve spool moves in response to a pressure difference between the spring-side control chamber and the springless-side control chamber.

18. A load-sensing multi-way valve work section comprising a valve body, which comprises a compensation valve and a reversing valve both formed therein,
- wherein the compensation valve is provided with a compensation valve bore formed in the valve body and a compensation valve spool accommodated in the compensation valve bore, with a compensation valve oil inlet chamber, a compensation valve oil outlet chamber, a spring-side control chamber and a springless-side control chamber all being formed inside the compensation valve bore;
- wherein the reversing valve is provided with a reversing valve bore formed in the valve body and a reversing valve spool accommodated in the reversing valve bore, the reversing valve spool being configured to control communications among a main oil inlet chamber, a first working oil chamber, a second working oil chamber, a first oil return chamber, a second oil return chamber, a first load-sensing feedback pressure sensing opening and a second load-sensing feedback pressure sensing opening formed in the reversing valve bore, the compensation valve oil outlet chamber being communicated to the main oil inlet chamber;
- wherein the load-sensing multi-way valve work section also defines a feedback passage formed within the valve body, the feedback passage being configured to communicate one of the first and second load-sensing feedback pressure sensing openings with the spring-side control chamber depending on a position of the reversing valve spool in the reversing valve bore;
- wherein a first annular pressure sensing groove communicating with the first load-sensing feedback pressure sensing opening and a second annular pressure sensing groove communicating with the second load-sensing feedback pressure sensing opening are both provided in the reversing valve bore;
- wherein in a condition that the reversing valve spool is located in a neutral position, the first load-sensing feedback pressure sensing opening is communicated with the first oil return chamber through the first annular pressure sensing groove and a first throttle groove which is formed on the reversing valve spool, and the second load-sensing feedback pressure sensing opening is communicated with the second oil return chamber through the second annular pressure sensing groove and a second throttle groove which is formed on the reversing valve spool;
- wherein a first balance groove is provided at a location locally in an inner wall of the reversing valve bore adjacent to the first annular pressure sensing groove, with a sum of respective axial dimensions of the first annular pressure sensing groove and the first balance groove being larger than an axial dimension of the first load-sensing feedback pressure sensing opening; and
- wherein a second balance groove is provided at a location, radially opposite to and symmetric with the first balance groove, in the inner wall of the reversing valve bore.

19. A load-sensing multi-way valve work section comprising a valve body, which comprises a compensation valve and a reversing valve both formed therein,
- wherein the compensation valve is provided with a compensation valve bore formed in the valve body and a compensation valve spool accommodated in the compensation valve bore, with a compensation valve oil inlet chamber, a compensation valve oil outlet chamber, a spring-side control chamber and a springless-side control chamber all being formed inside the compensation valve bore;
- wherein the reversing valve is provided with a reversing valve bore formed in the valve body and a reversing valve spool accommodated in the reversing valve bore, the reversing valve spool being configured to control communications among a main oil inlet chamber, a first working oil chamber, a second working oil chamber, a first oil return chamber, a second oil return chamber, a first load-sensing feedback pressure sensing opening and a second load-sensing feedback pressure sensing opening formed in the reversing valve bore, the compensation valve oil outlet chamber being communicated to the main oil inlet chamber;
- wherein the load-sensing multi-way valve work section also defines a feedback passage formed within the valve body, the feedback passage being configured to communicate one of the first and second load-sensing feedback pressure sensing openings with the spring-side control chamber depending on a position of the reversing valve spool in the reversing valve bore;
- wherein a first annular pressure sensing groove communicating with the first load-sensing feedback pressure sensing opening and a second annular pressure sensing groove communicating with the second load-sensing feedback pressure sensing opening are both provided in the reversing valve bore;
- wherein in a condition that the reversing valve spool is located in a neutral position, the first load-sensing feedback pressure sensing opening is communicated with the first oil return chamber through the first annular pressure sensing groove and a first throttle groove which is formed on the reversing valve spool, and the second load-sensing feedback pressure sensing opening is communicated with the second oil return chamber through the second annular pressure sensing groove and a second throttle groove which is formed on the reversing valve spool;
- two reversing valve springs respectively arranged in reversing valve spring chambers of the reversing valve bore at two opposite ends of the reversing valve spool; and
- two spring seats each located between the reversing valve spool and respective one of the two reversing valve springs, wherein each of the reversing valve springs exerts a thrust to the reversing valve spool through respective one of the spring seats, so that when the reversing valve spool is located in a neutral position, each of the two spring seats abuts against respective one of axial stops arranged in the reversing valve bore.

20. The load-sensing multi-way valve work section according to claim 19, wherein communicating passages, each of which being provided between respective end of the two ends of the reversing valve spool and respective one of the spring seats, are arranged to fluidly communicate the first oil return chamber and the second oil return chamber to respective reversing valve spring chambers, respectively, the communicating passages comprising: oil passages provided on respective surfaces of the ends or oil passages inside the ends of the reversing valve spool, and gaps provided between respective ends of the reversing valve spool and respective spring seats.

* * * * *